Dec. 8, 1936.   W. E. JOHNSON   2,063,682
MACHINE MOUNTING
Filed June 15, 1935
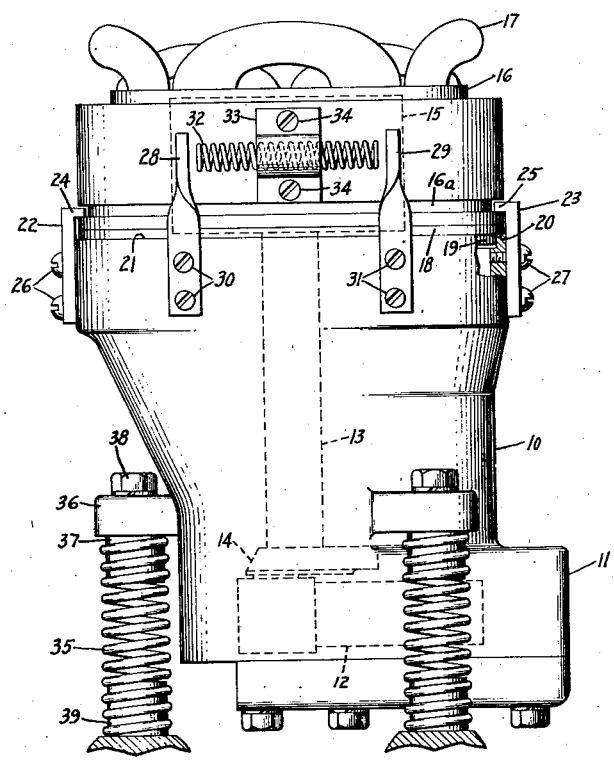
Inventor:
Wilfrid E. Johnson,
by Harry E. Dunham
His Attorney.

Patented Dec. 8, 1936

2,063,682

UNITED STATES PATENT OFFICE 2,063,682

MACHINE MOUNTING

Wilfrid E. Johnson, Schenectady, N. Y., assignor to General Electric Company, a corporation of New York Application June 15, 1935, Serial No. 26,789

15 Claims. (Cl. 230—232)

My invention relates to mountings for machines such as refrigerant compressors which are subjected to forced periodic vibration.

Many types of machines are subjected to forced periodic vibration during the normal operation thereof. For example, refrigerant compressors of the reciprocating type include a reciprocating piston or pistons which operate against gas pressures which vary during each revolution of the driving shaft of the compressor. Thus, differences in torque required to drive the compressor occur during different portions of each revolution of the drive shaft thereof and forced periodic vibrations are set up in the frame of the compressor. The frequency of the forced vibration imposed on the compressor in such case is usually substantially constant during the normal operation of the machine. When the frequency of the forced periodic vibration is either constant or lies within a range above some predetermined minimum during the normal operation of the machine, it is possible to proportion the moment of inertia of the machine in such manner that the natural frequency of vibration of the machine on a flexible mounting will be less than the frequency of the forced periodic vibration. It is desirable to design the machine so that the natural frequency thereof will be of such lower value since resonance is thus prevented during normal operation of the machine. Even when the machine is so designed difficulty has been encountered, however, during the starting and stopping periods. This difficulty has arisen because in the case of a refrigerant compressor, for example, the frequency of the forced vibration imposed thereon is of a smaller value during the starting and stopping periods, hence, a condition of increased amplitude of vibration may be encountered during such starting and stopping periods.

It is an object of my invention to provide a mounting for a machine subjected to forced periodic vibration which will minimize the vibratory movement of the machine, not only during the normal operation thereof, but during the starting and stopping periods thereof. I accomplish this by providing an arrangement for varying the effective moment of inertia of the machine and hence, the effective natural frequency of vibration thereof when the frequency of the forced periodic vibration approaches such effective natural frequency of the machine. In order to so vary the effective natural frequency of the machine I provide a mass which is mounted for limited relative movement with respect to the machine and an arrangement for minimizing such relative movement between the mass and the machine only when the frequency of the forced periodic oscillations is substantially different from the effective natural frequency of vibration of the machine and mass combined. In the illustrative form of my invention, I utilize the stator of an electric driving motor of a refrigerant compressor as the mass in minimizing the forced periodic vibration of the compressor. When such difference in frequencies exist, the periodic vibratory force acts on a structure having an effective natural frequency which is not equal to, or in other words, is not in resonance with the frequency of the vibratory force. My arrangement, however, permits relative movement between the machine and the movable mass when the amplitude of vibration of the machine attains a predetermined maximum. When such relative movement takes place the moment of inertia of the structure acted upon by the periodic vibratory force, that is, that of the machine alone, is different from the moment of inertia of the machine and the mass combined and hence, the effective natural frequency is also different so that a resonant condition is avoided.

Further objects and advantages of my invention will become apparent as the following description proceeds, and the features of novelty which characterize my invention will be pointed out with particularity in the claims annexed to and forming a part of this specification.

In the accompanying drawing, I have shown a refrigerant compressor provided with an arrangement embodying my invention for minimizing the forced periodic vibration thereof.

Referring to the drawing, I have shown a reciprocating type refrigerant compressor including a hollow cylindrical casing 10 provided with an integral lower extension 11 which forms a cylinder in which the compressor piston 12 is reciprocated by a rotating vertical drive shaft 13 through a crank and counterweight 14. The shaft 13 is rotated by an electric driving motor. This motor includes a rotor 15 which is secured to the upper end of the shaft 13 and a stator 16 which surrounds the rotor 15 and is provided with the usual energizing windings 17.

An annular bearing 18 is welded or otherwise rigidly secured to the lower end of the stator 16. The annular bearing 18 is provided with a reduced portion 19, which fits within the top of the casing 10, and a shoulder 20 at the base of the reduced portion which presents a flat bearing surface resting on the upper edge 21 of the casing 10.

The upper edge 21 of the casing 10 is suitably machined to form a complementary bearing surface contacting with the lower bearing surface 20 of the bearing 18. The weight of the stator 16 is thus carried by the bearing surface 21 of the casing 10 and the weight of the stator 16 causes a static friction between the contacting surfaces of the bearings 18 and 21. Vertical displacement of the stator 16 with respect to the casing 10 is prevented by a pair of L-shaped stops 22 and 23. The stops 22 and 23 are provided with inwardly extending portions 24 and 25 respectively which engage the shouldered edge of a groove 16a formed in the stator 16, the lower portions of the stops being secured to the casing 10 by screws 26 and 27 respectively.

Relative rotational movement between the stator 16 and casing 10 is limited by a pair of spaced stops 28 and 29 which are secured to the casing 10 by screws 30 and 31 respectively. The stops 28 and 29 cooperate with a helical compression spring 32 which is secured to the stator 16 by a bracket 33 and screws 34, the ends of the compression spring 32 being arranged in spaced relation with respect to the adjacent stops 28 and 29. A predetermined limited relative rotational movement between the stator 16 and the casing 10 is thus permitted.

The compressor and motor are preferably flexibly mounted on a series of vertical helical compression springs 35. Integral projecting feet 36 are formed on the casing 10, the feet being provided with holes through which bolts having enlarged lower ends 37 extend. These bolts are secured in place on the feet 36 by nuts 38. The upper ends of the supporting springs 35 closely surround and frictionally engage the enlarged ends 37 of the bolts and the lower ends of the springs 35 are secured to lugs 39 formed on the base or other supporting structure provided for the motor and compressor.

During the normal operation of the machine, described above, the rotor 15 of the electric driving motor rotates at a relatively constant speed and reciprocates the compressor piston 12. Since a varying torque is required to reciprocate the piston 12 during different portions of each stroke thereof, due to the varying pressure of the gas against which it acts, a periodic vibratory couple is exerted on the compressor casing 10. This periodic vibratory couple causes a forced periodic vibration of the compressor casing 10 on its flexible mounting springs 35. During the normal operation of the machine, the magnetic reaction between the rotor 15 and stator 16 causes the stator 16 to rotate about the axis of the shaft 13 to a position in which one side of the compression spring 32 is compressed against one of the stops 28 or 29. If the rotor 15 is rotating in a clockwise direction as viewed from the top, for example, the stator 16 will tend to rotate in a counterclockwise direction and the right-hand end of the spring 32 will be forced against the stop 29. The spring 32 and stop 29 thus counteract the normal motor torque.

The mass of the stator 16 and casing 10 are so distributed about the axis of rotation of the shaft 13 that the combined moment of inertia of the stator and casing, which is the effective moment of inertia of the casing when there is little or no movement between the stator and casing, is comparatively high. As a consequence, the effective natural frequency of vibration of the casing is lower than the frequency of the forced periodic vibration imposed thereon. The static friction between the contacting surfaces of the bearings at 19 and 20 causes a static friction torque which resists motion between the stator 16 and the casing 10. The friction between the bearings at 19 and 20 may be varied during manufacture of the machine either by changing the weight of the stator 16 or by changing the characteristics of the contacting surfaces of the bearings, that is, by making the surfaces rougher or smoother. The static friction thus produced is proportioned in such manner that the static friction torque will be sufficient to minimize movement between the stator 16 and casing 10 due to the vibratory couple imposed upon the casing 10 during ordinary running of the machine. There is thus no motion, or at least very little motion, between the stator 16 and casing 10 during ordinary running. As a consequence the vibratory couple acts not only on the casing 10, but also on the stator 16, and the effective natural frequency of the casing 10 is thus determined by the stator 16 and casing 10 combined.

When the supply of electric current to the motor is cut off thus stopping the machine under load, the rotor 15 slows down and as a consequence the frequency of the forced periodic vibration of the casing 10 also decreases. This decrease in the frequency of the forced periodic vibration causes the same to approach the effective natural frequency of the casing 10. When the frequency of a disturbing force applied to a structure is constant the maximum amplitude of vibration of the structure occurs when the frequency of the disturbing force and the natural frequency of the structure coincide, that is, at the resonance point. I have found, however, that when the disturbing force is transitory in character, that is, when its frequency is varying, the maximum amplitude vibration does not occur exactly at the point of coincidence of frequencies. For example, if the frequency of the disturbing force is decreasing the maximum amplitude of vibration occurs when the value of such frequency is somewhat less than the natural frequency of the structure. The difference between the value of the frequency of the disturbing force and the natural frequency of the structure at the point of maximum amplitude of vibration is directly proportional to the rate of change of the disturbing frequency. That is, when the frequency of the disturbing force is decreasing rapidly, for example, the maximum amplitude of vibration will occur when the frequency of the disturbing force has reached a smaller value than if the rate of change is small. The arrangement which I have provided is particularly advantageous in that it is operative to change the effective natural frequency of the casing 10 when a predetermined maximum amplitude of vibration thereof occurs irrespective of the exact relation of the frequency of the disturbing force thereto.

As the machine illustrated approaches a speed at which the vibratory disturbing force causes a predetermined maximum amplitude of vibration of the casing 10 and stator 16, the accelerating torque exerted on the stator by the vibratory disturbing couple tending to cause it to move with respect to the casing 10, becomes sufficient in magnitude to overcome the static friction torque between the bearings at 19 and 20. At the instant at which the accelerating torque on the stator 16 exceeds the static friction torque by an appreciable amount, the stator 16 is rotated with respect to the casing 10. This relative rotational movement, however, causes an instantaneous change in the effective moment of inertia of the casing 10. This in turn means a change in the effective natural frequency of the casing 10, so that the frequency relation causing a predetermined maximum amplitude of vibration no longer exists at the speed prevailing at that instant. The change in the effective moment of inertia of the casing 10 results from the fact that the casing 10 alone is subjected to the vibratory disturbing force rather than the casing 10 and stator 16 combined as is the case when the casing and stator are relatively immovably connected.

As soon as the stator 16 moves with respect to the casing 10 the accelerating torque exerted thereon is decreased due to the fact that the relation of frequencies causing the predetermined maximum amplitude of vibration no longer prevails as pointed out above, and the stator 16 consequently again becomes motionless with respect to the casing 10. This process is repeated rapidly while the machine is passing through its normal resonance speed range and thus prevents the building up of excessive vibratory movement of the entire structure during the decelerating period or stopping period of the machine.

While I have shown a particular embodiment of my invention in connection with a refrigerant compressor and electric driving motor therefor, I do not desire my invention to be limited to the particular construction shown and described, and I intend in the appended claims to cover all modifications within the spirit and scope of my invention.

What I claim as new and desire to secure by Letters Patent of the United States, is:—

1. A machine subjected to forced periodic vibration during the normal operation thereof, and means including a mass mounted for limited movement with respect to said machine for changing the effective moment of inertia of said machine only when the amplitude of said forced periodic vibration reaches a predetermined maximum.

2. A machine subjected to forced periodic vibration during the normal operation thereof, a mass mounted for limited movement with respect to said machine, and means including a frictional connection between said machine and said mass for changing the effective moment of inertia of said machine only when the amplitude of said forced periodic vibration reaches a predetermined maximum.

3. A machine subjected to forced periodic vibration during the normal operation thereof, a mass mounted on said machine and in contact with a portion thereof for movement in a limited path, and means utilizing static friction between said mass and said machine for changing the effective moment of inertia of said machine only when the amplitude of said forced periodic vibration reaches a predetermined maximum.

4. A machine subjected to forced periodic vibration during the normal operation thereof and subjected to a transitory vibration during the starting and stopping thereof, and means including a mass mounted for limited movement with respect to said machine for changing the effective moment of inertia of said machine when said machine is subjected to a transitory vibrational force causing the same to attain a predetermined maximum amplitude of vibration.

5. A machine subjected to forced periodic vibration during the normal operation thereof and subjected to a transitory vibration during the starting and stopping thereof, a mass in contact with a portion of said machine and mounted thereon for movement in a limited path, and means utilizing the static friction between said mass and said machine for changing the effective moment of inertia of said machine when said machine is subjected to a transitory vibrational force causing the same to attain a predetermined maximum amplitude of vibration.

6. A refrigerant compressor including a reciprocating piston subjecting the same to forced periodic vibration during the normal operation thereof, an electric driving motor for said compressor, and means utilizing such electric driving motor for changing the effective moment of inertia of said compressor only when the amplitude of said forced periodic vibration reaches a predetermined maximum.

7. A refrigerant compressor including a reciprocating piston subjecting the same to forced periodic vibration during the normal operation thereof, an electric driving motor for said compressor, said motor including a stator and a rotor, means for mounting said stator on said compressor in contact with a portion thereof, and means utilizing said stator for changing the effective moment of inertia of said compressor only when the amplitude of said forced periodic vibration reaches a predetermined maximum.

8. A refrigerant compressor including an open top vertical cylindrical casing and a reciprocating piston subjecting said casing to forced periodic vibration during the normal operation thereof, an electric driving motor for said compressor, said motor including a stator and a rotor, means for mounting said stator on the top of said casing and in contact therewith, and means utilizing the static friction between said stator and said casing for changing the effective moment of inertia of said casing only when the amplitude of said forced periodic vibration reaches a predetermined maximum.

9. A refrigerant compressor including an open top vertical cylindrical casing and a reciprocating piston subjecting said casing to forced periodic vibration during the normal operation thereof, a bearing surface formed on the top of said casing and presenting a flat upper surface, an electric driving motor for said compressor, said motor including a stator and a rotor, means including a bearing surrounding the lower portion of said stator and presenting a flat lower surface in contact with said first-mentioned bearing surface for mounting said stator on the top of said casing, and means utilizing the static friction between said bearing surfaces for changing the effective moment of inertia of said casing only when the amplitude of said forced periodic vibration reaches a predetermined maximum.

10. A refrigerant compressor including an open top vertical cylindrical casing and a reciprocating piston subjecting said casing to forced periodic vibration during the normal operation thereof, a bearing surface formed on the top of said casing and presenting a flat upper surface, an electric driving motor for said compressor, said motor including a stator and a rotor, means including a bearing surrounding the lower portion of said stator and presenting a flat lower surface in contact with said first-mentioned bearing surface for mounting said stator on the top of said casing, means utilizing the static friction between said bearing surfaces for changing the effective moment of inertia of said casing only when the amplitude of said forced periodic vibration reaches a predetermined maximum, and means for preventing relative vertical movement between said stator and said casing.

11. A machine subjected to forced periodic vibration during the normal operation thereof, means including a mass mounted for limited movement with respect to said machine for changing the effective moment of inertia of said machine only when the amplitude of said forced periodic vibration reaches a predetermined maximum, and means for limiting relative rotational movement between said mass and said machine.

12. A machine subjected to forced periodic vibration during the normal operation thereof, a mass in contact with said machine and mounted thereon for movement in a limited path, means utilizing the static friction between said mass and said machine for changing the effective moment of inertia of said machine only when the amplitude of said forced periodic vibration reaches a predetermined maximum, and means for limiting relative rotational movement between said mass and said machine.

13. A refrigerant compressor including a reciprocating piston subjecting the same to forced periodic vibration during the normal operation thereof, an electric driving motor for said compressor said motor including a stator and a rotor, means for mounting said stator on said compressor in contact with a portion thereof, means utilizing said stator for changing the effective moment of inertia of said compressor only when the amplitude of said forced periodic vibration reaches a predetermined maximum, and means for limiting relative rotational movement between said stator and said compressor.

14. A refrigerant compressor including an open top vertical cylindrical casing and a reciprocating piston subjecting said casing to forced periodic vibration during the normal operation thereof, an electric driving motor for said compressor, said motor including a stator and a rotor, means for mounting said stator on the top of said casing and in contact therewith, means utilizing the static friction between said stator and said casing for changing the effective moment of inertia of said casing only when the amplitude of said forced periodic vibration reaches a predetermined maximum, and means including a pair of stops secured to said casing and a compression spring secured to said stator for limiting relative rotational movement between said casing and said stator.

15. A refrigerant compressor including a casing and a reciprocating piston subjecting the same to forced periodic vibration during the normal operation thereof and subjecting said casing to a transitory vibration during the starting and stopping of said piston, an electric driving motor for said compressor, said motor including a stator and a rotor, means for mounting said stator on said compressor in contact with a portion thereof, and means utilizing said stator for changing the effective moment of inertia of said compressor when said compressor is subjected to a transitory vibrational force causing the same to attain a predetermined maximum amplitude of vibration.

WILFRID E. JOHNSON.